(No Model.)
E. NOWILL.
BUTTON HOLE CUTTER.
No. 397,438. Patented Feb. 5, 1889.
FIG:1.
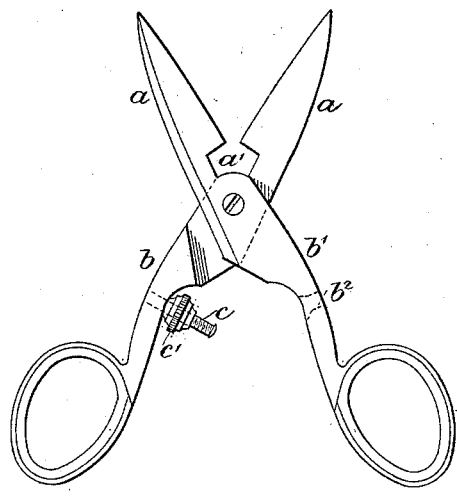
FIG:2.
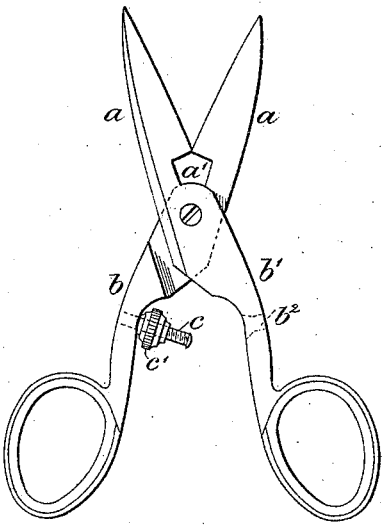
FIG:3.
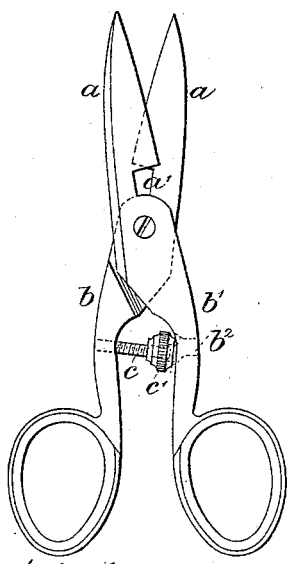
FIG:4.
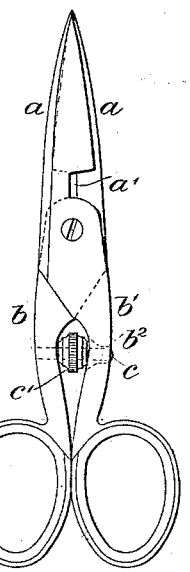
FIG:5.
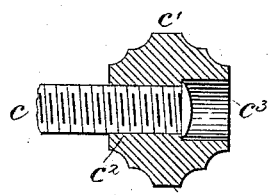
Attest,
E. Arthur
Wm E Knight
Inventor,
Ernest Nowill
By Knight Bros.
Attys.

UNITED STATES PATENT OFFICE.

ERNEST NOWILL, OF WEST DULWICH, COUNTY OF SURREY, ENGLAND.

BUTTON-HOLE CUTTER.

SPECIFICATION forming part of Letters Patent No. 397,438, dated February 5, 1889.

Application filed October 31, 1888. Serial No. 289,596. (No model.)

*To all whom it may concern:*

Be it known that I, ERNEST NOWILL, manufacturer's clerk, of Rosendale, Carson Road, West Dulwich, in the county of Surrey, England, a subject of the Queen of Great Britain, have invented certain new and useful Improvements in the Construction of Button-Hole Scissors, of which the following is a specification.

My invention relates to an improvement on the invention of G. W. Korn, patented October 4, 1881, No. 247,766; and it consists in the employment of a nut formed with a bore of two different diameters, the smaller diameter being screw-threaded to work upon a screw-threaded spindle somewhat similar to that shown in said patent.

And in order that the said invention may be more clearly understood and readily carried into effect, I will proceed, aided by the accompanying drawings, more fully to describe the same.

In the drawings, Figure 1 is a plan of a pair of button-hole scissors constructed according to my invention, representing the blades parted beyond their cutting position in order clearly to show the construction thereof. Fig. 2 is a similar view, but showing the blades in the position they would assume at the commencement of a cut. Fig. 3 is a similar view, but showing the blades in the position they would assume at the termination of a cut, the regulating device being adjusted for the smallest button-hole. Fig. 4 is a similar view, but showing the blades completely closed, or in the position they would assume at the termination of a cut, the regulating device being adjusted for the largest button-hole; and Fig. 5 is a detail view of the regulating device drawn to an enlarged scale.

In the several figures of the drawings like parts are indicated by similar letters of reference.

$a$ represents the blades of the scissors, which are notched or cut away at the point $a'$, as is usual in scissors of this class, in order that the cut may commence at a given distance from or within the edge or selvage of the fabric.

$b$ $b'$ represent the "shanks" of the scissors, which are approximately of the ordinary shape and dimensions. As in said patent, I rivet or otherwise fix to the shank $b$ a stud or spindle, $c$, formed with a screw-thread thereon, and upon this threaded stud or spindle $c$, I place a nut, $c'$, formed with a corresponding screw-thread therein, and I burr over or rivet the end of the stud or spindle $c$, in order to prevent the nut $c'$ becoming accidentally detached therefrom.

According to my invention the shank $b'$ has a hole or recess, $b^2$, formed therein or therethrough in order to receive the end of the spindle $c$ at such times as it projects beyond the nut $c'$, and thus allow of the scissors being partially closed in the formation of a button-hole of medium size, as shown at Fig. 3, or completely closed in the formation of a button-hole of the largest size, or for transport, as represented at Fig. 4. The bore of the nut $c'$, as will be more clearly seen on reference to Fig. 5, is formed of two different diameters, the smaller part, $c^2$, of the bore, which extends about half-way through the nut $c'$, having a screw-thread formed therein to engage with the screw-thread of the spindle or stud $c$, and the larger part, $c^3$, of the bore being formed with a plain surface thereto. The enlarged or riveted end of the spindle $c$ being unable to pass through the smaller part, $c^2$, of the nut $c'$ effectually prevents the latter becoming detached therefrom. The object of this peculiar formation is to give the nut $c'$ a sufficient extent of traverse along the screw-threaded stud or spindle $c$ and to enable it to project beyond or overhang the same, so as to admit of the necessary regulation of the degree of cut of the scissors, and yet enable me to employ a stud or spindle, $c$, of such length that when the scissors are in their closed position, as represented at Fig. 4, the end of the spindle $c$ will lie snugly within and will not project beyond the shank $b'$ thereof. If, for example, I employed a nut, $c'$, having a screw-thread formed throughout the entire length of its bore, the enlarged head of the spindle $c$, which is necessary in order to prevent the parts becoming detached, would not allow the nut $c'$ to project beyond or overhang the end of such spindle $c$, and consequently I should be unable to obtain the degree of adjustment necessary for small button-holes unless I were to employ a stud or spindle of such length that it would project beyond the shank $b'$ when the scissors were closed.

The action of the device is as follows: When the scissors are in use, the nut $c'$ is screwed along the spindle $c$ until it is in such a position that by acting as a stop to the shank $b'$ it limits the closing motion of the blades $a$ to the extent necessary to produce a button-hole of the required size, and after having obtained this adjustment any number of button-holes may be cut all of equal length. When the scissors are out of use, the nut $c'$ is screwed along the spindle $c$ until it abuts against the shank $b$, and the scissors are then closed, the projecting end of the spindle $c$ lying snugly within the hole or recess $b^2$ in the shank $b'$.

Having now particularly described and ascertained the nature of my said invention and in what manner the same is to be performed, I declare that what I claim is—

In button-hole scissors, the employment of a nut, $c'$, formed with a bore of two different diameters, the smaller diameter being threaded to work upon a screwed spindle, $c$, projecting from the inner side of one of the shanks $b$ and passing into a hole or recess, $b^2$, in the shank $b'$, all constructed and arranged in manner substantially as herein shown and described, and for the purpose stated.

ERNEST NOWILL.

Witnesses:
   C. M. WHITE,
   F. W. WOODINGTON,
*Both of 27 Southhampton Buildings, London.*